United States Patent [19]
O'Neill

[11] 4,324,375
[45] Apr. 13, 1982

[54] HEAT SINK/FLUID-TO-FLUID MECHANICAL COUPLING OF SPACECRAFT COOLANT SYSTEMS

[75] Inventor: Richard F. O'Neill, Carlsbad, Calif.

[73] Assignee: General Dynamics Corporation, San Diego, Calif.

[21] Appl. No.: 106,934

[22] Filed: Dec. 26, 1979

[51] Int. Cl.³ .................... B64G 1/50; G05D 23/00
[52] U.S. Cl. ................................ 244/163; 62/299; 165/46; 165/185; 165/80 R; 244/117 A
[58] Field of Search .................... 244/117 A, 1 R, 163, 244/173, 158, 159; 165/46, 185, 76, 80 R; 62/298, 299

[56] References Cited

U.S. PATENT DOCUMENTS

| | | | |
|---|---|---|---|
| 3,210,957 | 10/1965 | Rufishauser et al. | 62/299 |
| 3,293,868 | 12/1966 | Gonzalez | 165/46 |
| 3,475,590 | 10/1969 | Pins | 165/46 |
| 3,749,156 | 7/1973 | Fletcher et al. | 244/163 |
| 3,956,673 | 5/1976 | Seid | 165/76 |
| 4,085,728 | 4/1978 | Tomchak | 165/76 |
| 4,161,212 | 7/1979 | Hightower | 244/173 |
| 4,196,772 | 4/1980 | Adamski et al. | 165/46 |
| 4,226,281 | 10/1980 | Chu | 165/185 |

*Primary Examiner*—Galen L. Barefoot

*Attorney, Agent, or Firm*—John R. Duncan; Frank D. Gilliam

[57] ABSTRACT

A spacecraft modular system with two components of a cooling system, one in each replacement hardware module and one in the satellite station, with a coupling means in the replacement module in the form of heat sink which collects heat from the heat generating hardware in the replacement module. The heat sink incorporates heat sink fins which interdigitize with coolant tubes in the satellite coolant system and make a mechanical interface with the fins in response to the satellite coolant system pressure for a thermally efficient heat exchange from the replacement module to the satellite coolant system. In another embodiment, replacement module coolant tubes interdigitize directly with the satellite coolant tubes in a fluid pressure responsive thermally efficient mechanical contact to provide a fluid-to-fluid mechanical coupling. The satellite cooling system is arranged in subsystems to isolate the coupling means from the remainder of the satellite cooling system to permit coupling and decoupling of selected modules without disturbing the remainder of the cooling system. Also involved is a method of forming a compound bend for the interdigitizing tubing arrangement of the second embodiment.

15 Claims, 10 Drawing Figures

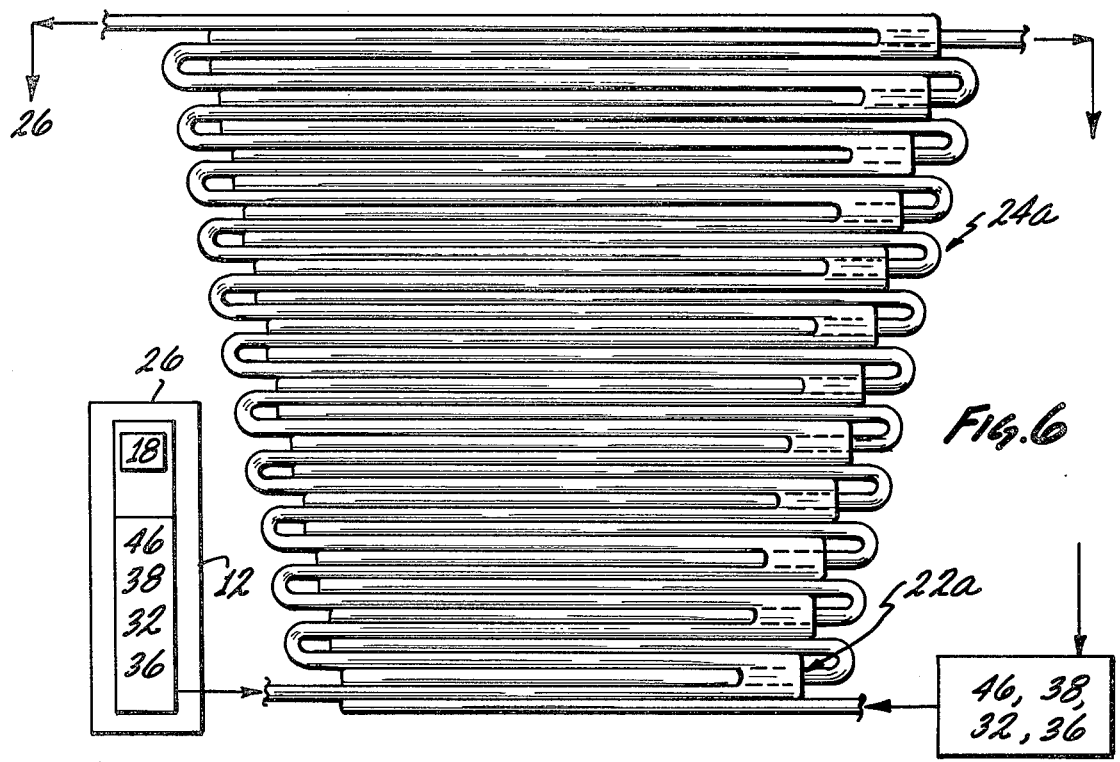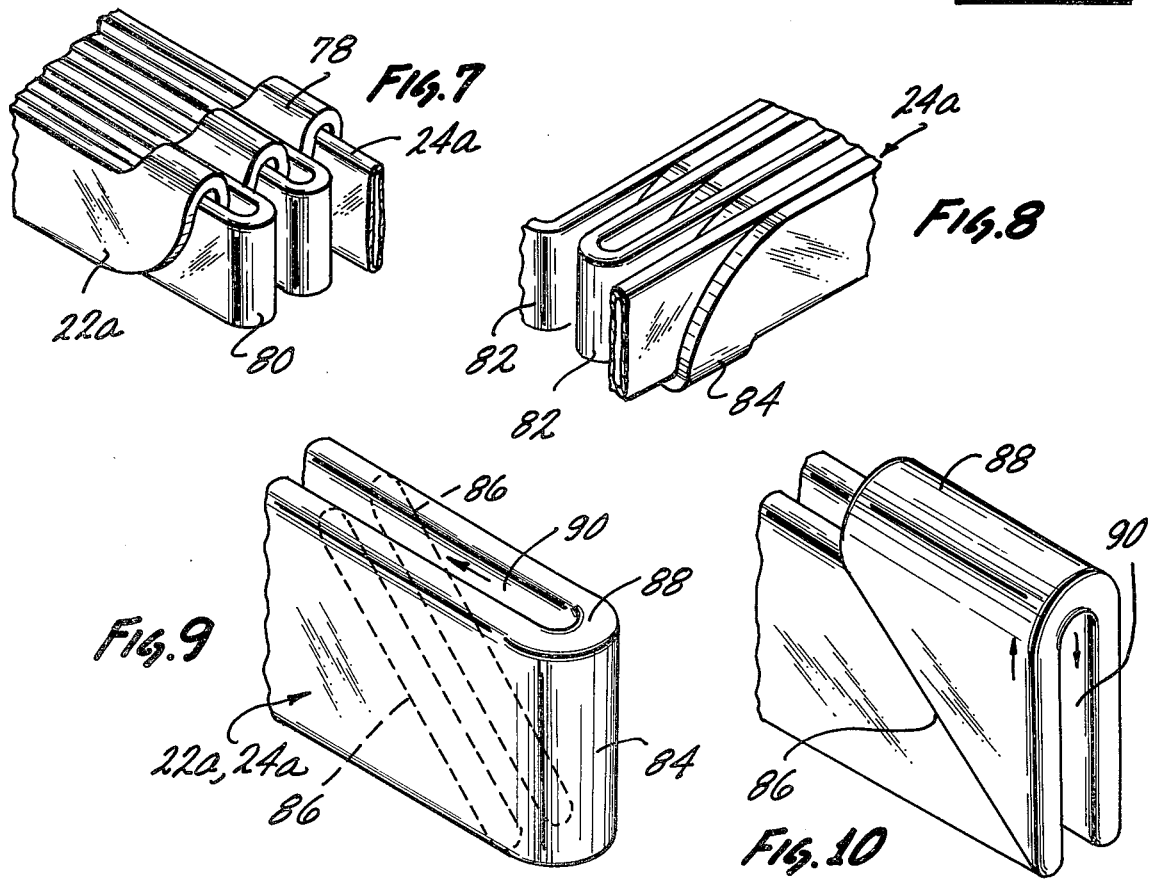

HEAT SINK/FLUID-TO-FLUID MECHANICAL COUPLING OF SPACECRAFT COOLANT SYSTEMS

RELATED APPLICATION

U.S. Application for Letters Patent of Edward J. Hujsak, entited ROVING GEOSYNCHRONOUS ORBIT SATELLITE MAINTENANCE SYSTEM, now U.S. Pat. No. 4,298,178, issued Nov. 3, 1981.

BACKGROUND OF THE INVENTION

In the Hujsak application, supra, there is disclosed a roving autonomous maintenance vehicle for servicing orbiting satellite stations, capable of operating autonomously in the geosynchronous corridor for long periods of time in a standby mode and capable of proceeding on command to the selected satellite station to perform a maintenance function thereon automatically. The disclosed maintenance vehicle is provided with replacement hardware modules which are exchanged with a module in the satellite station which may have experienced a failure, or to upgrade the outdated hardware in the satellite, to thus prolong the life of the satellite. This is particularly useful in the communications field where the technological advances move rapidly. Since the modules contain hardware which are heat generating when in use in the satellite station, and since both the module and the satellite station must have a system for dissipating heat for the satellite station and the modules to properly function together, there is a problem involved in withdrawing a module from the satellite station without disrupting the satellite cooling system and at the same time substituting a new module from the maintenance vehicle and coupling the new module into the satellite cooling system so that the heat generated in the new module can be rejected by the satellite cooling system.

Accordingly, it is a primary object to this invention to provide a means by which a hardware component, functioning as part of the satellite cooling system, can be withdrawn from the satellite station without interference with the satellite cooling system, be replaced with a new component which is then coupled into the satellite cooling system for the continued operation of the satellite station.

A more specific object of this invention is to provide a modular system permitting on orbit automated coupling and decoupling between spacecraft heat generating elements and spacecraft heat rejecting elements.

SUMMARY OF THE INVENTION

The invention which attain the foregoing objects comprises a means for thermally coupling, two components of a cooling system, one in the replacement hardware module and one in the satellite station. In one embodiment, the coupling means is a heat sink on the replacement module which collects heat from the heat generating hardware in the module. The heat sink incorporates fins which are arranged to interdigitize with a plurality of coolant tubes in the satellite coolant system which make a mechanical interface with the fins in response to the satellite coolant system pressure for a thermally efficient heat exchange. In another embodiment, coolant tubes of the replacement module are formed to interdigitize directly with the coolant tubes of the satellite in a fluid pressure responsive thermally efficient mechanical contact and thus provide a fluid-to-fluid mechanical coupling. The satellite cooling system is arranged in subsystems to isolate the coupling means from the remainder of the system to permit coupling and decoupling of selected modules without disturbing the remainder of the cooling system.

This invention also involves a method of forming a compound bend for the interdigitizing tubing arrangement of the second embodiment. Accordingly, it is apparent from the foregoing and from the following detailed description that an additional object of this invention is a provision of two separate cooling systems which can be interdigitized by mechanical thermally efficient couplings and which can be coupled and decoupled without disturbing the operation of either of the two systems.

Still another object of this invention is to provide a method of forming compound bends in tubes for interdigitizing the tubing of two different cooling systems for mechanical fluid-to-fluid thermally efficient heating exchange.

BRIEF DESCRIPTION OF THE DRAWINGS

FIG. 6 is an illustration of the mechanical fluid-to-fluid coupling between two coolant systems as the second embodiment of the invention, FIGS. 7 and 8 are enlarged and more detailed views of the coupling systems of FIG. 6, and FIGS. 9 and 10 shown one method of forming the coupling system of FIGS. 6-8.

BRIEF DESCRIPTION OF THE PREFERRED EMBODIMENTS

Figures 1, 2:
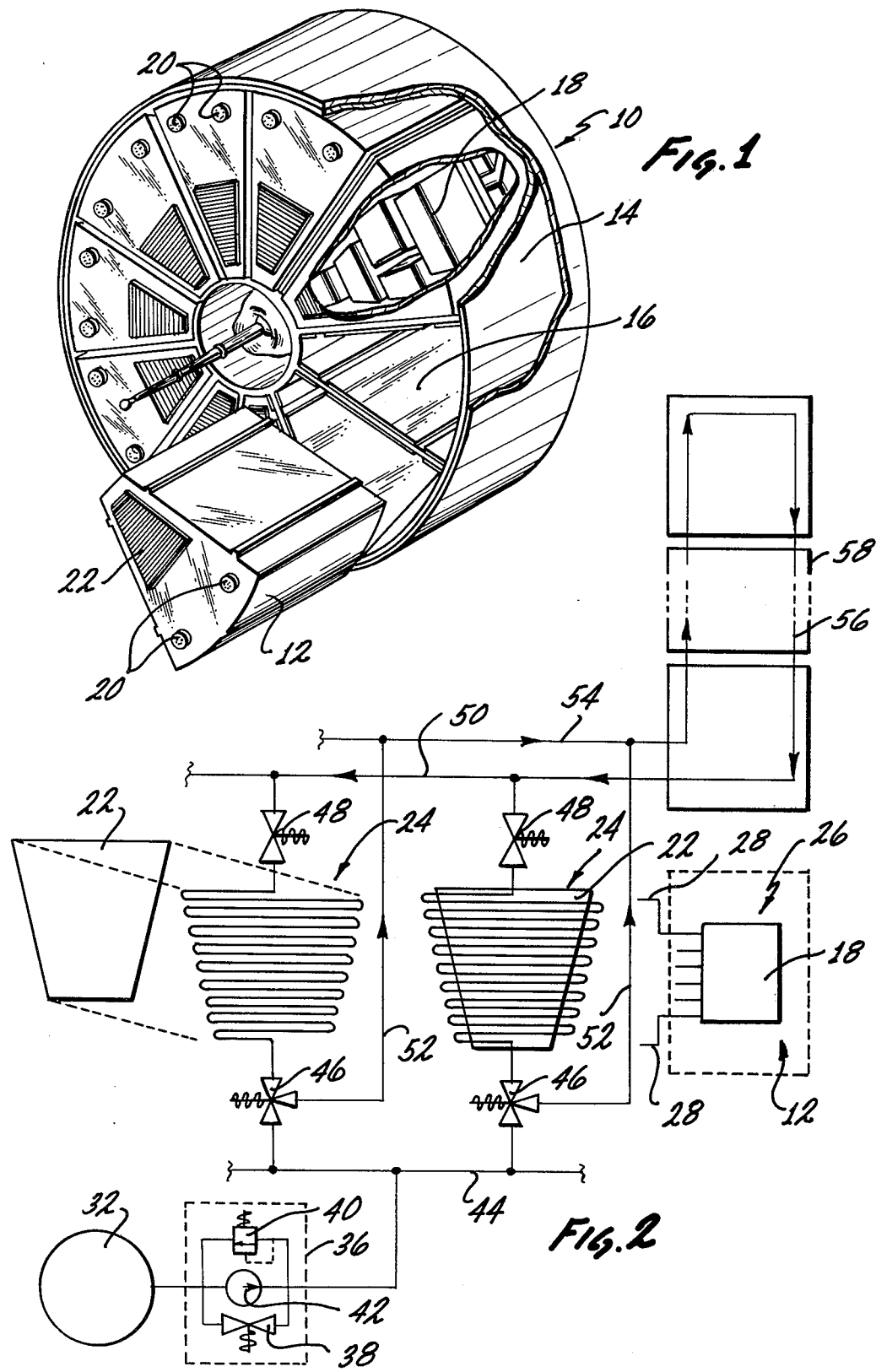
FIG. 1 is a perspective view of one end of a geosynchronous orbiting maintenance vehicle with its replacement modules incorporating heat dissipating, ie, heat sink components of this invention.
FIG. 2 is a simplified schematic illustration of a satellite heat rejection system showing the heat sink of one replacement module coupled to the satellite coolant system, and the heat sink of another replacement module decoupled from the satellite coolant system.

FIG. 1 shows one end of a maintenance vehicle 10 containing replacement modules 12 arranged in the vehicle's rotating cradle 14. This figure is similar to a figure of the aforesaid Hujsak Application where it is explained that when the maintenance vehicle 10 is berthed with an oribiting satellite station (not shown herein) which also contains modules, the module to be replaced is withdrawn from the satellite station into an empty slot such as 16 in the rotatable cradle, the cradle is then rotated to the correct position so that the replacement module can be ejected into the oribiting satellite.

These modules are sealed packages of replacement hardware shown as 18 and configured to fill the slots in the circular cradle and suitable indexing and drive means are provided in the maintenance vehicle to rotate the cradle, to retain the modules in their respective slots during standby operation, to withdraw module to be replaced from the satellite station and to eject a new module into the satellite station.

Each module contains suitable connectors such as 20 for electrical connection to the satellite station and since the hardware in the modules are heat generating, when in use in the satellite station, and since the satellite station must have a cooling system for rejecting the generated heat to function properly, there is a problem in withdrawing a module from the satellite without disrupting the satellite cooling system and at the same time substituting a new module from the maintenance vehicle and connecting it into the satellite cooling system. As previously mentioned, this invention is directed to the means for decoupling the module heat dissipating system from the satellite cooling system and coupling a new module into the satellite station, without breaking into the satellite station cooling system, yet providing a positive, efficient, thermal coupling to the satellite cooling system so that the heat generated by the heat module hardware can be rejected by the satellite cooling system. So again referring to FIG. 1, there is shown an element 22 which acts as a means for providing the positive coupling to the satellite cooling system and yet forms a part of the heat dissipating system of the module. This part is actually a heat sink, functioning in the dissipating system of the module, and is more clearly shown in the perspective view, FIG. 3.

The heat sink 22 and the multiple loops of coolant tubing 24 represent one embodiment of the invention as the mechanical means for coupling the heat dissipating system of the module into the cooling system of the satellite and as will be clear later in this detailed description, in the second embodiment of the invention, the module, in lieu of the heat sink, will be provided with loops of tubes suitably arranged for coupling into the satellite cooling system as a direct fluid-to-fluid mechanical coupling.

To explain first how this thermal mechanical positive coupling is accomplished and what it does as part of the overall coolant system, attention is first directed to FIG. 2. The module heat dissipating arrangement, whether a heat sink, or a direct mechanical fluid-to-fluid connection, is illustrated as a truncated triangle 22, one of which is shown disconnected from, and another is shown connected to, an arrangement of loops 24 of tubes, or fluid lines, outlining a configuration which agrees generally with the truncated triangular configuration of the element 22. The number of loop arrangements 24 will correspond the number of modules in the satellite station. The module heat dissipating system, as a whole, is identified as 26 and is illustrated schematically as heat pipes 28 located adjacent the replacement hardware 18 to transfer heat to the heat sink 22. The heat pipe system is preferred but tubing located around the replacement hardware with coolant circulating therethrough and connected to the heat sink could also be employed.

The satellite cooling system, on the other hand, is provided with a low pressure reservoir 32 and a pressurization/depressurization assembly 36 containing repressurization valve 38, regulator 40 and positive displacement pump 42, all of which are connected to a return line or tubing 44. Each loop arrangement 24 is provided with isolation valves 46 and 48 through which coolant fluid flows from an inlet line 50 to the tubing arrangement 24, out through outlet valve 46 to outlet line 52 and line 54 where fluid is directed to the satellite radiators 56 one of which is illustrated herein schematically. These radiators 56 are a part of a radiator array 58 for the satellite stations but since the radiator array forms no part of this invention, the array is only shown as the means for circulating coolant for cooling the fluid from the outlet lines 52 and 54 where the cooler fluid returns through a return line 50 back to the tubing arrangement 24.

To accommodate the number of modules and the number of tubing arrangements 24, each tubing arrangement is connected in parallel both to the inlet line 50 and the outlet line 54 by subsystem branch outlet line 52 so that each individual tubing arrangement becomes a subsystem which can be isolated (disconnected) by valves 46 and 48 prior to decoupling and coupling of the module heat dissipating system 26. Also, the isolating valve 46 is a three-way valve which is used to depressurize the subsystem to permit heat sink 22 to be disconnected from the truncated triangular tubing arrangement 24 and to repressurize the subsystem to the satellite coolant system pressure for mechanical connection to the replacement heat sink.

To depressurize the subsystem, three-way valve 46 is opened to return line 44 and depressurization valve 38 is opened to low-pressure reservoir 32 permitting fluid flow thereto. To repressurize the subsystem following replacement of heat sink 22, valve 38 is closed, and positive displacement pump 42 returns fluid from reservoir 32 to return line 44. Regulator 40 does not permit pressure in line 44 to exceed the satellite cooling system operating pressure.

As can be seen from the foregoing, the decoupling of each subsystem will not interfere with the flow of coolant in the other subsystems in the satellite station.

Figure 3:
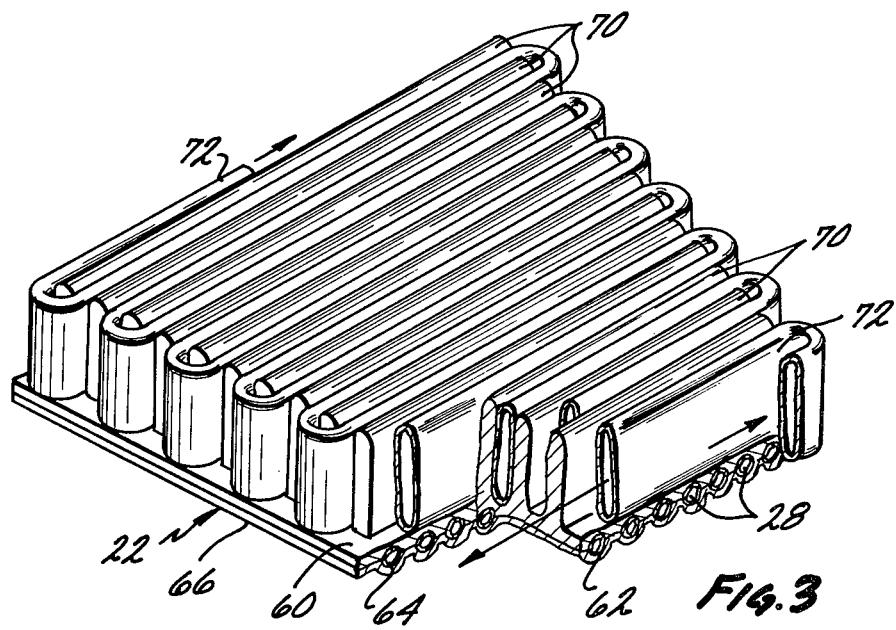
FIG. 3 is a perspective view, partially broken away of the heat sink of the first embodiment of this invention shown mechanically coupled to the coolant system of the satellite.
Figure 4:
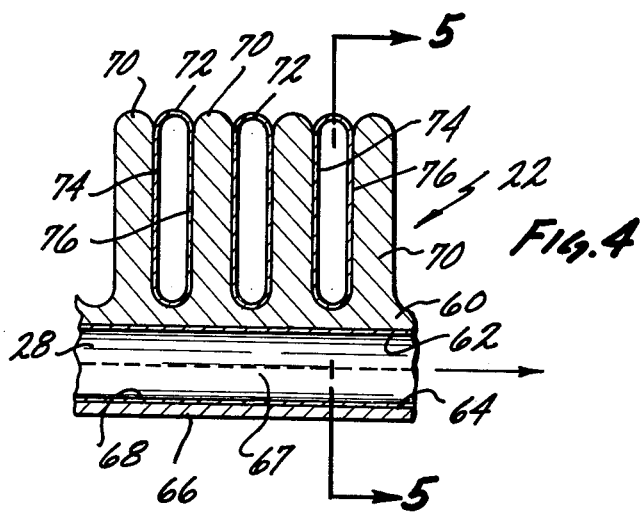
FIG. 4 is an enlarged, partial, cross-sectional view illustrating the mechanical interconnection between the fins of the heat sink and the coolant system of the satellite.
Figure 5:
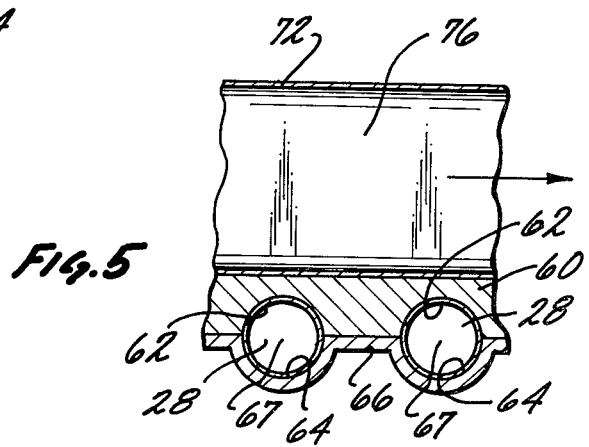
FIG. 5 is an enlarged, partial, cross-sectional view of the heat sink taken along 5—5 of FIG. 4.

Since it is recognized that, for the module to have a maximum transfer of heat to the satellite cooling system, it must be connected mechanically to the satellite cooling system, attention is now directed to FIGS. 3-5 where such a mechanical connection is shown in detail.

As shown in FIG. 3, the truncated triangular heat sink 22 is formed of a base plate 60 of a suitable heat conductive material, such as aluminum, having on one face a plurality of semi-circular grooves 62 which complement similarly formed semi-circular grooves 62 which complement similarly formed semi-circular grooves 64 formed in a relatively thin cover plate 66 of the same truncated triangular shape as the base plate. The semi-circular grooves 62 and 64 accommodate the installation of the condensation ends 67 of heat pipes 28 in the heat sink 22 and, as such, represent the preferred way to carry the heat generated by the hardware 18, when the module is in use in the satellite station, to the heat sink 22 where it is transmitted to fins 70 formed in the base plate 60 on the side opposite the semi-circular grooves 62. These fins are spaced apart to accommodate coolant tubes 72, and, as mentioned previously, are configured in a triangular arrangement 24 to accommodate the truncated heat sink 22. Too, the same circular grooves 62 and 64 would have flat side walls to accommodate flat sided heat pipes, if the latter are used.

Thus, this triangular truncated arrangement of the tubes 72 conform to that previously described in connection with FIG. 2 and in operation are interdigitized with the fins of the heat sink. This interdigitating of the heat transfer means (fins) and the satellite coolant tubes 72, as a concept, is carried over to the second embodiment of this invention, described later.

The tubing 72, for the satellite coolant is thin walled, flat stainless, steel or aluminum with flat side walls 74 and 76 and, when subjected to pressure of the satellite cooling system, expand so that the sidewalls engage their adjacent fins and form a positive interface contact pressure needed for efficient thermal coupling. Conversely, depressurization of the subsystem of the satellite in which a particular module is connected, permits automated removal and replacement without breaking into the fluid coolant loop of the satellite.

In the second embodiment of this invention (shown in FIG. 6), a plurality of tubes are formed in parallel spaced relationship and configured preferably in a truncated triangular form, 22a, and, if selected as the embodiment for the maintenance vehicle, this coolant tube configuration would be on the end of the module as 22a instead of the heat sink 22 as shown in FIG. 1. These truncated triangular configured tubes 22a would receive, in interdigital relationship, a plurality of tubes 24a on the satellite system side but the difference is that the tubes 24a in this embodiment make direct contact with the tubes 22a rather than with a heat sink as in the case of the other embodiment. Provision would thus be required in the second embodiment to independently depressurize and repressurize tubing configuration 22a as well as and in an identical fashion to 24a as previously described for tubing 24. Also as mentioned previously coolant would circulate through the tubing 22a to transfer heat from the hardware to the tubing 22a under the pressure of a pump as shown schematically in FIG. 6.

Turning now specifically to FIGS. 6-8, there is shown the two systems, one for the module and one for the satellite station both formed in a truncated triangular configuration (although this could be rectangular configuration to conform with the configuration of the module). Each system is provided with parallel spaced apart tubes to mate with similarly oriented tubes, however, in order to provide the interdigital relationship, the tubes must be formed in a combination of regular corner bends and compound bends. FIG. 7 shows the tubing of the satellite station formed in a compound bend 78 and engaging end loops 80 of the maintenance vehicle tubing. FIG. 8 shows the other end of the tubing with the module tubing being the simple bend 82 and the satellite cooling system tubing forming a compound bend 84 so that the two tubings may be interdigitized.

Since the compound bend of the tubing form an aspect of this invention, attention is directed now to FIGS. 9 and 10 which show one method of making such a bend.

FIG. 9 shows a simple bend 84 of the tubing whether tubing 22a or 24a. By cutting the tubing at a 45° angle, as at 86, the resultant piece 88 can be reoriented so that a cavity 90, which was in line with the axis of the remainder of the tubing, is now transverse (downward as shown in the drawing) the aforesaid axis. This piece 88 is then reconnected at the cut 86 by soldering or brazing to form a continuous tubing with a compound bend as shown in FIG. 10. With such a compound bend the interdigital relationship as shown in FIGS. 6-8 is accomplished.

Again, in this embodiment where the two coolant systems are together, the satellite substation and the module system are pressurized to cause the flat side walls of tubing 24a to engage the adjacent flat side walls of the module tubing 22a for direct mechanical contact to maximize thermal transfer of heat from the module tubing to the satellite tubing. When the module is to be replaced, the satellite substation in question and the module system are depressurized to allow the module tubing 22a to be withdrawn and replaced. After replacement, the subsystems in question are again pressurized.

Finally, by way of example of a typical system, coolant tubes forming arrangement 24 or 22a, 24a can be made of 1.25×0.22 inch tubing, 0.10 in wall thickness with approximately 25 psi operating pressure on the fluid sides of the subsystems.

What is claimed is:

1. In a separable system having a first cooling system which contains heat generating elements adapted to couple with a second fluid circulating cooling system, the improvement comprising,
   means in said first system for dissipating heat from the heat generating elements,
   said heat dissipating means having means for selectively coupling to said second system in a direct mechanical connection when positioned adjacent thereto and uncoupling for removing said mechanical connection for remote positioning thereof in response to the pressure of the fluid in one of said systems.

2. The system as claimed in claim 1 wherein said heat dissipating means includes a heat sink with cooling fins which interdigitize with parallel spaced apart coolant tubing in said second system, the pressure in said second system expanding said coolant tubing to engage said fins.

3. The system as claimed in claim 2 wherein said second system contains means for pressurizing the fluid in said tubing to cuase the walls of said tubing to expand against said fins and means for depressurizing said second system to retract said walls and allow decoupling of said fins therefrom.

4. The system as claimed in claim 3 wherein said parallel spaced apart coolant tubing has flat parallel side walls which move apart to engage in said fins in response to fluid pressure in said second system.

5. The system as claimed in claim 4 wherein said heat sink on one side has means for receiving the condensation end of heat pipes and wherein said fins are located on the other side of said heat sink.

6. The system as claimed in claim 5 wherein said heat sink is in the form of a relatively thin flat truncated triangle.

7. The system as claimed in claim 2 wherein said second system comprises a plurality of subsystems each having means for isolating each subsystem from all other subsystems to permit pressurization and depressurization of each individual subsystem to allow coupling and decoupling of said selected heat dissipating means.

8. In a system having a first cooling system which contains heat generating elements adapted to couple with a second fluid circulating cooling system, the improvement comprising,
   means in said first system for dissipating heat from the heat generating elements,
   said heat dissipating means comprises a plurality of spaced apart parallel coolant tubing which interdigitize with parallel spaced apart coolant tubing in said second system, the pressure in said systems expanding said coolant tubing to bring said coolant tubing into engagement.

9. The system as claimed in claim 8 wherein both systems contain means for pressurizing the fluid in said tubing to cause the walls of said tubing to expand against walls of the other tubing, and means for depressurizing said systems to retract said walls and allow decoupling of said heat dissipating means therefrom.

10. The system as claimed in claim 9 wherein said parallel spaced apart coolant tubing has flat parallel side walls which move apart to engage the tubing of said heat dissipating means in response to fluid pressure in said systems.

11. The system as claimed in claim 10 wherein said heat dissipating means is formed to outline a truncated triangle.

12. The system as claimed in claim 11 wherein said flat side walled coolant tubing of heat dissipating means and said flat side walls tubing of said second system each have complementary simple and compound bend which allow said tubing to couple each other in interdigitizing relationship.

13. In a system having a first cooling system which contains heat generating elements adapted to couple with a second fluid circulating cooling system, the improvement comprising, means in said first system for dissipating heat from the heat generating elements, said heat dissipating means includes a heat sink with cooling fins which interdigitize in a direct mechanical connection with parallel spaced apart coolant tubing in said second system, the pressure in said second system expanding said coolant tubing to engage said fins, said second system is incorporated in a device for geosynchronous orbiting as a satellite with a plurality of modules, said modules each containing a first coolant system, heat generating units and heat dissipating means.

14. A spacecraft for oribiting in a geosynchronous corridor and containing a plurality of individual self contained modules for the functioning of said satellite, said device having tubing containing fluid coolant as part of a cooling system which receives heat generated by said modules and transfers said heat to a radiator in said device so as to return cooler fluid to said modules, means for pressurizing and moving the fluid in said tubing, said cooling system containing a plurality of subsystems one for each of said modules in said device, each subsystem having means for coupling said tubing to said module in response to pressure in said cooling system and means for isolating each subsystem from other subsystems to permit depressurization of said subsystem and thus decouple said module from said subsystem without interference in the flow of fluid in said other subsystems.

15. The system as claimed in claim 14 wherein each module contains replacement hardware for maintaining said orbiting satellite station.

* * * * *